Figure 1:
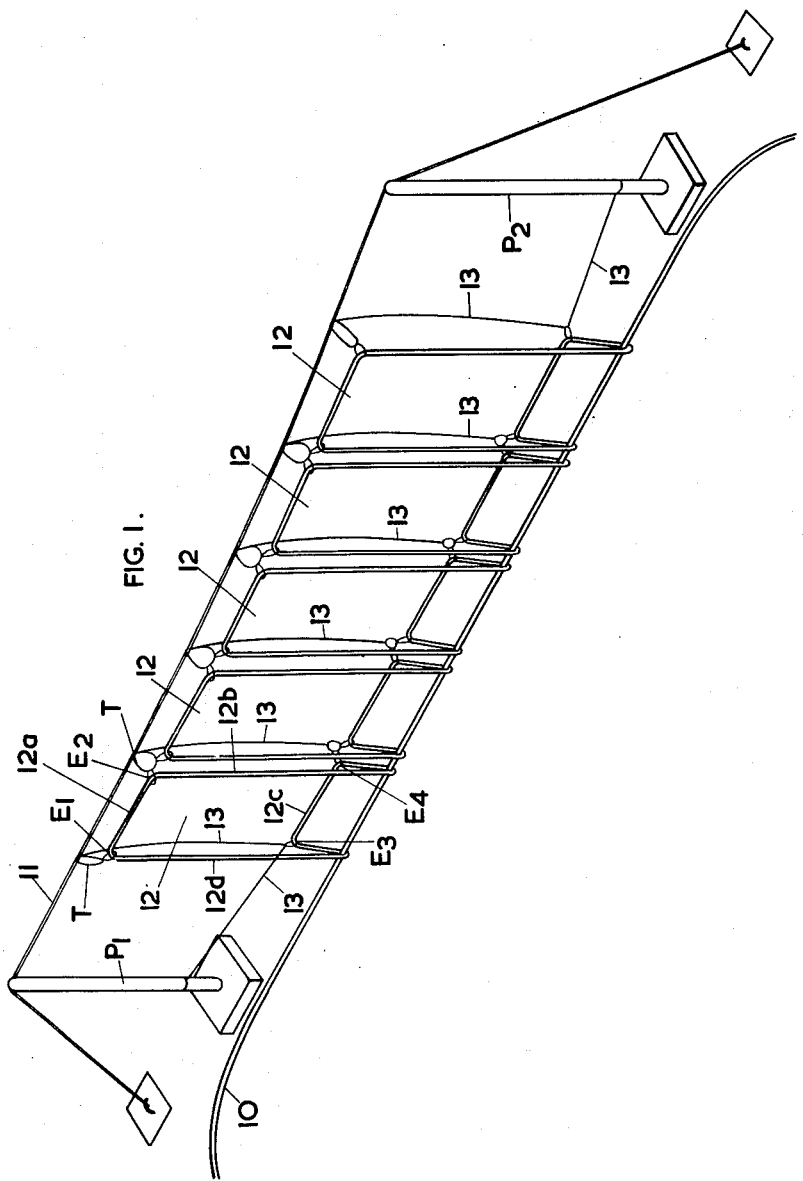

Sept. 21, 1965　　　W. H. KINCH　　　3,207,459
ARRESTER GEAR FOR AIRCRAFT
Filed Dec. 26, 1963　　　3 Sheets-Sheet 1

Inventor
W. H. KINCH
By
Cameron, Kerkam & Sutton
Attorneys

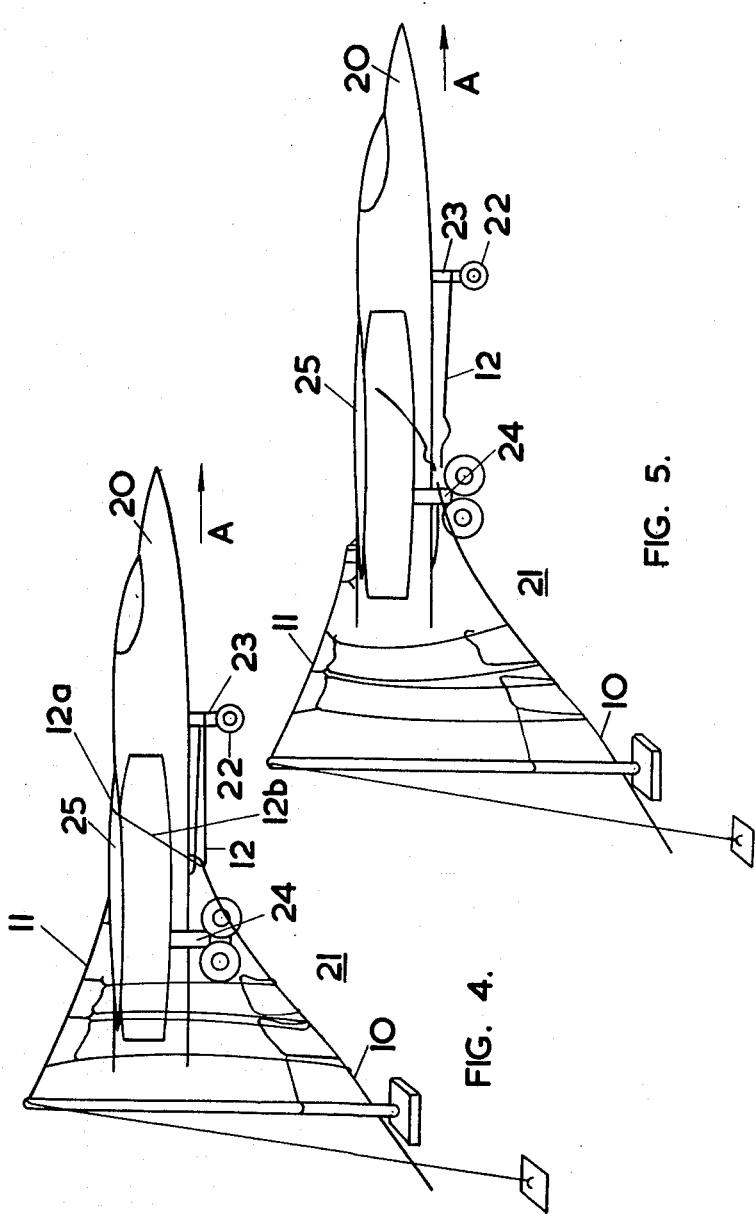

United States Patent Office 3,207,459
Patented Sept. 21, 1965

3,207,459
ARRESTER GEAR FOR AIRCRAFT
William Henry Kinch, Milton Ernest, England, assignor to the Minister of Aviation in Her Majesty's Government of the United Kingdom of Great Britain and Northern Ireland, London, England
Filed Dec. 26, 1963, Ser. No. 333,321
Claims priority, application Great Britain, Jan. 7, 1963, 666/63
12 Claims. (Cl. 244—110)

This invention relates to arrester gear for aircraft, particularly for use in arresting the motion of a so-called tricycle undercarriage aircraft having a wheel on a single leg at the nose of the aircraft.

Generally speaking arrester gear may be divided into two classes.

The first class is that designed for use under normal conditions. The arrester gears fitted on aircraft carriers are of this class and consist of a wire rope stretched across the ship's deck or runway and connected at each end to a braking system. The rope is engaged by a hook carried on the aircraft so bringing the braking system into action to arrest the aircraft.

The second class is intended for emergency use, e.g. on a ship when the first class of gear, for some reason, cannot be used, or on an airfield when an aircraft not fitted with an arrester hook is in danger of running off the end of the paved runway. In this class the aircraft is arrested by a barrier net or a wire rope as before, the wire, however, in this class engaging the struts of the main undercarriage, or by a combination of both net and wire. The barrier net or wire rope is attached at each end to a braking system which provides the arresting force.

Where, in the second class of gear a wire rope is used to engage the main undercarriage struts, one of the problems is the lifting of the wire after the nose wheel has passed over it, up on to the struts to a position where the arresting load can be safely applied to the aircraft. The time available for this is, of course, very limited.

It will be understood that if the nose wheel or its supporting leg should engage an arrester wire either prematurely or incorrectly it is possible for the aircraft to be thrown violently off course and either damaged or destroyed.

Accordingly the invention is an arrester gear for nose wheel tricycle undercarriage aircraft comprising in combination an arrester wire traversing the landing path of the aircraft, a support wire or jack-stay arranged above and approximately parallel with the arrester wire high enough to clear the aircraft fuselage, and a continuous loop of flexible material hanging from the support wire and arranged to span the fuselage, the loop being lightly attached in an upper region to the support wire and including two spaced legs which depend downwardly from the upper attachment and pass under the arrester wire and upwardly to a height intermediate the arrester wire and support wire, the loop being completed by a horizontal leg joining the lower ends of the downwardly depending legs, the arrangement being such that, when the leading wheel under-carriage leg of an aircraft engages the lower horizontal leg of the loop the subsequent forward motion of the aircraft tends to elongate the loop in the horizontal direction thus breaking the attachment to the support wire and bringing the upper region of the loop down into contact with an upper or leading region of the aircraft structure and also raising the arrester wire towards the underside of the fuselage of the aircraft, that is to say, to a height at which the subsequent motion of the aircraft will bring the wire into contact with the main undercarriage legs. Advantageously the flexible loop is arranged in four distinct legs of which the ends of the upper horizontal leg are attached to the supporting wire.

It will be understood of course that the dimensions of the loop of flexible material must be arranged to suit a particular aircraft. It will be obvious that if the loop is too long the arrester wire will not be raised soon enough after the leading wheel has passed over it, in which case arrest will not be made. If the loop is too short it may break before the arrester wire is brought into proper engagement with the main undercarriage legs and the aircraft may not be arrested.

Preferably, a complete arrester barrier consists of a number of loops which are arranged contiguously side by side across the runway and may be separate or interconnected as desired, the arrangement being such that the line of the lower horizontal legs is effectively unbroken across the runway and the adjacent vertical legs remain in contiguity.

An embodiment of the invention will now be described with reference to the accompanying diagrammatic drawings in which:

FIGURE 1 is a view in perspective of the components of a multi-loop arrester gear looking along a runway, and FIGURES 2, 3, 4 and 5 are side views showing an aircraft entering the barrier, and the arrester wire being raised to the arresting position.

Referring to FIGURE 1 the gear as shown consists of an arrester wire 10, a support or jack-stay wire 11 supported on masts $P_1$ and $P_2$ at each side of the runway and five continuous loops 12 of nylon webbing each arranged in four distinct legs 12a, 12b, 12c and 12d. The ends $E_1$, $E_2$ of the upper horizontal leg 12a are, in each loop, lightly attached by easily breakable ties T to the support wire 11. Each of the vertical legs 12b and 12d descends to the arrester wire 10, passes underneath and rises to the position shown which is about one third of the way between the arrester wire and the support wire. The lower ends of the vertical legs, that is to say ends $E_3$ and $E_4$, are maintained in this position by light chords 13 attached to the support wire as shown. The loop is completed by the lower horizontal leg 12c. The arrester wire 10 is connected at each end to a braking device, not shown.

Figure 2:
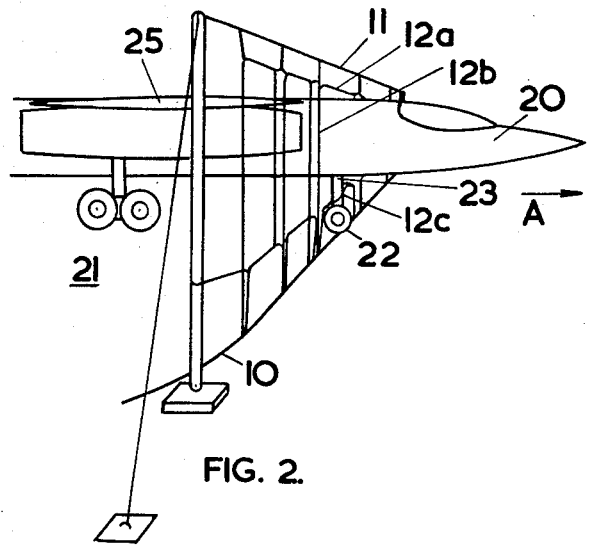
Figure 3:
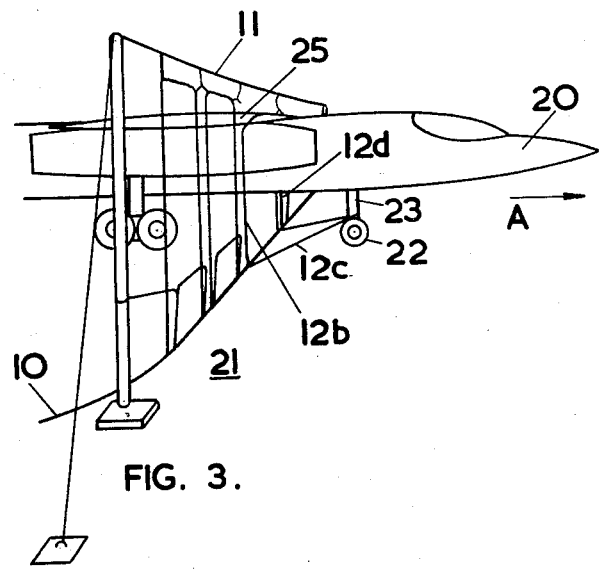

Referring to FIGURES 2, 3, 4 and 5 the aircraft 20 is shown in FIGURE 2 on the runway 21 at the instant when the leading undercarriage wheel 22 passes over the arrester wire 10. It will be seen from FIGURES 2 and 3 that as the wheel 22 passes over the wire 10 the undercarriage leg 23 will engage the lower horizontal leg 12c of one of the continuous flexible loops 12. The continued motion of the aircraft in the direction of the arrow A thus causes the legs 12b, 12d of the engaged loop to be pulled under the arrester wire at the same time tending to both raise the arrester wire and draw the support wire 11 down towards the top of the aircraft fuselage. In this position the loop is properly deployed to lift the arrester wire. Further motion of the aircraft in the direction of the arrow A brings the vertical legs 12b, 12d of the engaged loop into contact with the leading edges of the wings 25 of the aircraft and the upper horizontal leg 12a into contact with the fuselage as shown in FIGURE 4. At this stage of the landing the light chords 13 and ties T joining the horizontal legs 12a, 12c to the support wire break and, as shown in FIGURE 4, the arrester wire 10 is suspended beneath the fuselage of the aircraft by the flexible loop 12.

As the aircraft continues down the runway the engaged loop either stretches or breaks under tension because of the braking forces applied by the arrester wire which itself is drawn rearwardly to bring it in contact with the main undercarriage legs 24, whereafter the passage of the aircraft is arrested in the usual way.

It is to be understood that the masts $P_1$ and $P_2$ on which the arrester gear is mounted may be erectile masts which, together with the arrester gear, normally lay flat on the runway, the erection of the masts being brought about automatically, as desired, so raising the gear across the landing path of the aircraft. Examples typical of such erectile masts are disclosed in British patent specifications Nos. 794,407 and 893,458.

I claim:

1. An arrester gear for nose wheel tricycle undercarriage aircraft comprising in combination an arrester wire traversing the landing path of the aircraft, a support wire arranged above and approximately parallel with the arrester wire high enough to clear the aircraft fuselage, and a continuous loop of flexible material hanging from the support wire and arranged to span the fuselage, the loop being lightly attached in an upper region to the support wire and including two spaced legs which depend downwardly from the upper attachment and pass under the arrester wire and upwardly to a height intermediate the arrester wire and support wire, the loop being completed by a horizontal leg joining the lower ends of the downwardly depending legs, the arrangement being such that, when the landing wheel undercarriage leg of an aircraft engages the lower horizontal leg of the loop, the subsequent forward motion of the aircraft tends to elongate the loop in the horizontal direction thus breaking the attachment to the support wire and bringing the upper region of the loop down into contact with an upper leading region of the aircraft structure and also raising the arrester wire towards the underside of the fuselage of the aircraft, that is to say, to a height at which the subsequent motion of the aircraft will bring the wire into contact with the main undercarriage legs.

2. An arrester gear as claimed in claim 1 in which the loop of flexible material is arranged in four distinct legs of which two depend downwardly and two are horizontal, the upper horizontal leg at least being attached to the supporting wire.

3. An arrester gear as claimed in claim 2 in which the ends of both the upper and lower horizontal legs are attached to the supporting wire.

4. An arrester gear as claimed in claim 3 in which there are a number of loops of flexible material which are arranged contiguously side by side across the runway, the arrangement being such that the line of the lower horizontal legs is effectively unbroken across the runway and the adjacent downwardly depending legs remain in contiguity.

5. An arrester gear as claimed in claim 2 in which there are a number of loops of flexible material which are arranged contiguously side by side across the runway, the arrangement being such that the line of the lower horizontal legs is effectively unbroken across the runway and the adjacent downwardly depending legs remain in contiguity.

6. An arrester gear as claimed in claim 1 in which there are a number of loops of flexible material which are arranged contiguously side by side across the runway, the arrangement being such that the line of the lower horizontal legs is effectively unbroken across the runway and the adjacent downwardly depending legs remain in contiguity.

7. An arrester gear as claimed in claim 1 including masts at the sides of the runway on which the support wire is mounted.

8. An arrester gear as claimed in claim 2 including masts at the sides of the runway on which the support wire is mounted.

9. An arrester gear as claimed in claim 3 including masts at the sides of the runway on which the support wire is mounted.

10. An arrester gear as claimed in claim 4 including masts at the sides of the runway on which the support wire is mounted.

11. An arrester gear as claimed in claim 5 including masts at the sides of the runway on which the support wire is mounted.

12. An arrester gear as claimed in claim 6 including masts at the sides of the runway on which the support wire is mounted.

References Cited by the Examiner

UNITED STATES PATENTS 2,770,431  11/56  Snow _____ 244—110

FOREIGN PATENTS 178,930  4/62  Sweden.

FERGUS S. MIDDLETON, *Primary Examiner.*
ANDREW H. FARRELL, MILTON BUCHLER,
*Examiners.*